(12) United States Patent
Lindig et al.

(10) Patent No.: US 9,030,383 B2
(45) Date of Patent: May 12, 2015

(54) DISPLAY DEVICE AND DISPLAY METHOD

(75) Inventors: Karsten Lindig, Erfurt (DE);
Hans-Juergen Dobschal, Kleinromstedt (DE); Guenter Rudolph, Jena (DE)

(73) Assignee: Carl Zeiss AG, Oberkochen (DE)

( * ) Notice: Subject to any disclaimer, the term of this patent is extended or adjusted under 35 U.S.C. 154(b) by 952 days.

(21) Appl. No.: 13/121,168

(22) PCT Filed: Sep. 14, 2009

(86) PCT No.: PCT/EP2009/061871
§ 371 (c)(1),
(2), (4) Date: Sep. 16, 2011

(87) PCT Pub. No.: WO2010/034639
PCT Pub. Date: Apr. 1, 2010

(65) Prior Publication Data
US 2012/0001833 A1 Jan. 5, 2012

(30) Foreign Application Priority Data
Sep. 29, 2008 (DE) .......................... 10 2008 049 407

(51) Int. Cl.
*G09G 5/00* (2006.01)
*G02B 27/01* (2006.01)
(Continued)

(52) U.S. Cl.
CPC ............ *G02B 27/017* (2013.01); *G02B 6/0038* (2013.01); *G02B 27/0172* (2013.01); *G02B 2027/0118* (2013.01);
(Continued)

(58) Field of Classification Search
USPC .......... 345/7–8, 156–174, 690; 359/630–633, 359/434; 385/146
See application file for complete search history.

(56) References Cited

U.S. PATENT DOCUMENTS

| 5,015,086 A | 5/1991 | Okaue et al. |
| 5,369,415 A | 11/1994 | Richard et al. |
| 5,646,784 A | 7/1997 | Wilson |

(Continued)

FOREIGN PATENT DOCUMENTS

| AU | 199894131 A1 | 6/2000 |
| DE | 2 156 045 | 5/1973 |

(Continued)

OTHER PUBLICATIONS

Shechter, R., et al., "Planar holographic configuration for efficient imaging," *Optics Communications*, 132 (1996) 221-226.

*Primary Examiner* — Grant Sitta
(74) *Attorney, Agent, or Firm* — Patterson Thuente Pedersen, P.A.

(57) ABSTRACT

A display device has a holding device wearable on a user's head and holding a multifunctional glass that comprises a first and second coupling-out section and a coupling-in section, an image generation module that generates and couples an image into the multifunctional glass through the coupling-in section to the first coupling-out section redirecting the image in the direction of the user such that the user can perceive the image in superimposition with the real environment, a control unit for the image generation module, and a detector which is connected to the control unit and which measures the intensity of ambient light coupled through the first coupling-out section to the second coupling-out section and coupled out of the multifunctional glass through the second coupling-out section. The control unit controls the brightness of the image of the image generation module, the brightness controlled according to the intensity measured by the detector.

22 Claims, 13 Drawing Sheets

(51) Int. Cl.
   *G09G 3/00*       (2006.01)
   *F21V 8/00*       (2006.01)
(52) U.S. Cl.
   CPC ......... *G02B 2027/014* (2013.01); *G09G 3/001* (2013.01); *G09G 2320/0626* (2013.01); *G09G 2360/144* (2013.01)

(56) References Cited

U.S. PATENT DOCUMENTS

| | | | |
|---|---|---|---|
| 5,654,786 A | 8/1997 | Bylander | |
| 6,379,009 B1 | 4/2002 | Fergason | |
| 6,407,724 B2* | 6/2002 | Waldern et al. | 345/8 |
| 6,417,969 B1* | 7/2002 | DeLuca et al. | 359/630 |
| 6,559,813 B1* | 5/2003 | DeLuca et al. | 345/8 |
| 6,630,914 B1* | 10/2003 | Tamekuni et al. | 345/8 |
| 6,829,095 B2 | 12/2004 | Amitai | |
| 7,310,072 B2* | 12/2007 | Ronzani et al. | 345/8 |
| 7,312,765 B2* | 12/2007 | de Wit et al. | 345/7 |
| 7,391,573 B2* | 6/2008 | Amitai | 359/630 |
| 2004/0085649 A1* | 5/2004 | Repetto et al. | 359/633 |
| 2004/0150758 A1* | 8/2004 | Tomono | 349/11 |
| 2005/0099525 A1* | 5/2005 | Mogamiya et al. | 348/345 |
| 2005/0174651 A1* | 8/2005 | Spitzer et al. | 359/630 |
| 2005/0179706 A1 | 8/2005 | Childers | |
| 2006/0132914 A1 | 6/2006 | Weiss et al. | |
| 2007/0070859 A1* | 3/2007 | Hirayama | 369/112.04 |
| 2007/0103388 A1* | 5/2007 | Spitzer | 345/8 |
| 2007/0189701 A1 | 8/2007 | Chakmakjian et al. | |
| 2007/0195012 A1* | 8/2007 | Ichikawa et al. | 345/8 |
| 2007/0217017 A1* | 9/2007 | Ichikawa | 359/630 |
| 2008/0278812 A1* | 11/2008 | Amitai | 359/487 |
| 2009/0128451 A1* | 5/2009 | Tokui | 345/55 |
| 2010/0085462 A1* | 4/2010 | Sako et al. | 348/333.01 |

FOREIGN PATENT DOCUMENTS

| | | |
|---|---|---|
| DE | 198 14 094 A1 | 10/1999 |
| DE | 10 2006 022 962 A1 | 11/2007 |
| DE | 10 2007 0001 266 A1 | 7/2008 |
| EP | 0 344 881 A2 | 12/1989 |
| EP | 0 922 985 A1 | 6/1999 |
| EP | 1 158 336 A2 | 11/2001 |
| GB | 1 359 499 | 7/1974 |
| JP | 10-319240 A | 12/1998 |
| WO | WO 93/18428 | 9/1993 |
| WO | WO 00/28592 | 5/2000 |
| WO | WO 02/06858 A2 | 1/2002 |
| WO | WO 2008/089992 A1 | 7/2008 |

* cited by examiner

DISPLAY DEVICE AND DISPLAY METHOD

PRIORITY CLAIM

The present application is a National Phase entry of PCT Application No. PCT/EP2009/061871, filed Sep. 14, 2009, which claims priority from German Application Number 102008049407.0, filed Sep. 29, 2008, the disclosures of which are hereby incorporated by reference herein in their entirety.

FIELD OF THE INVENTION

The present invention relates to heard worn display devices in which a generated image is superimposed on an image of the perceptible surroundings.

BACKGROUND OF THE INVENTION

A display device with a multifunctional glass is known e.g. from WO 2008/089992 A1. In this case, it is difficult to generate the image such that the user can perceive it in good contrast to the surroundings, as the brightness of the surroundings can vary greatly.

A head worn display device and method such that a good contrast of the generated image relative to the perceptible surroundings is achieved during the superimposition is needed.

SUMMARY OF THE INVENTION

A head worn display device in which a generated image is superimposed on an image of the perceptible surroundings and further providing a detector that is connected to the control unit and that measures the intensity of ambient light coupled via the first coupling-out section into the multifunctional glass, guided in the latter to the second coupling-out section and coupled out of the multifunctional glass via the second coupling-out section, and the control unit controls the brightness during the generation of the image by means of the image generation module depending on the intensity measured by the detector.

A feature and advantage of embodiments is that excellent adaptation to the ambient brightness can thus be achieved. At the same time, the optical structure is simple, as the first coupling-out section which is needed for the superimposition of the generated image with the perceptible surroundings is equally also used to couple ambient light into the multifunctional glass.

In embodiments of the invention, the second coupling-out section and the coupling-in section can be the same section. In this case, the beam path through which the image is guided in the multifunctional glass from the coupling-in section to the first coupling-out section can equally be used to be passed through by the coupled-in ambient light in the opposite direction. Furthermore, a beam splitter which directs the light coupled out of the second coupling-out section onto the detector can be arranged between the second coupling-out section and the image generation module. The optical structure of a known display device of the type named at the beginning can thus be preserved in principle, as long as the beam splitter can be arranged between the image generation module and the multifunctional glass.

An advantage of embodiments is forming the coupling-in section such that it carries out the function of the beam splitter. This leads to a very compact display device.

In embodiments of the display device, the control unit can interrupt the image generation of the image generation module during the intensity measurement by means of the detector. Undesired scattered light effects from the image generation module can thus be reduced during the measurement of the intensity. In particular, the image generation is interrupted so briefly that a user cannot perceive the image interruption.

A phototropic layer can be formed on the front side of the multifunctional glass. This can be formed either as a passive or as an active layer, the transmittance of which can be controlled. As the ambient brightness is measured after passing through the phototropic layer, the effect of the reduction in the transmission due to the phototropic layer is thus equally taken into account.

The first coupling-out section can be formed on the front side or rear side of the multifunctional glass. It can be formed as a holographic element, diffractive element or refractive element.

The display device can be formed for one eye of the user. However, it is also possible to form it for both eyes of the user, wherein there are then two multifunctional glasses (one for the right and one for the left eye of the user). With this binocular formation, the image can be represented as a stereo image.

In embodiments of the display device, the detector not only measures the brightness as such, but carries out a space-resolved measurement of the brightness. In particular, the perceptible surroundings can be projected as an image into the detector and recorded by the latter. It is thus possible to vary the brightness space-resolved during the image generation, with the result that e.g. in the case of bright-to-dark transitions in the perceptible surroundings the image reflected into has an adapted image brightness in order to achieve the desired contrast. Thus, for example, when representing a text, the area of the text which lies in the bright area of the surroundings can be represented dark and the part of the text which lies in the dark area of the surroundings can be represented bright.

The coupling-out section can have a first section and a second section, wherein only the first section, which is formed of a plurality of reflective and/or refractive deflecting elements spaced apart from each other, effects the deflection of the image by reflection and/or refraction. In particular, the coupling-out section can be divided into the first and second sections.

Because of the deflecting elements which act reflectively and/or refractively, a deflection of the image can be realized for large wavelength ranges (in particular compared with deflection with diffraction gratings).

The first section can have an imaging function for the image. Thus, not only is the desired deflection effected, but an imaging property is equally also realized by means of the first section. The imaging property of the first section can correspond to an imaginary optical effective surface which is curved and preferably does not have mirror and rotational symmetry. The effective surface can also have no translational symmetry. Of course, it is also possible that the imaginary optical effective surface is rotationally symmetric (e.g. rotational asphere) or toric. In particular, the surface of the first section, seen in top view onto the first coupling-out section, can preferably be 5 to 30% of the surface of the first coupling-out section. The proportion of the first section to the first coupling-out section can, however, also be 50% or more.

The deflecting elements can be formed at a material interface of the body. A particularly simple manufacture is thus possible, e.g. by means of diamond cutters. Furthermore, a production by moulding and casting methods is possible.

Each deflecting element can be formed flat. However, a curved formation of the individual deflecting elements is also possible.

In particular, all the deflecting elements can be formed identical. Alternatively, the formation of the deflecting elements can vary.

The deflecting elements are preferably irregularly distributed in the first coupling-out section, can be formed polygonal and/or have a maximum extent in the range of preferably 20-30 μm. The maximum extent can, however, also be 200 μm or 100 μm.

The first coupling-out section can be formed such that the part of the ambient light which strikes the first section is shaded and thus not perceptible for the user. Alternatively, it is also possible that the first section is transmissive for the ambient light.

The first section can be formed in the manner of a discontinuous Fresnel structure. The Fresnel structure can have an imaging property that corresponds to the imaginary optical effective surface.

The reflective formation of the deflecting elements can be achieved by a reflective coating. The reflective coating can lead to a complete reflection or also to a partial reflection. Furthermore, it is possible to realize the reflective effect by total internal reflection. In this case, no reflective coating is needed.

The multifunctional glass can be formed in particular such that the image of the image generation module is guided in the multifunctional glass to the first coupling-out section. This can take place for example by reflections at the material interfaces. In particular, these can be total internal reflections.

Furthermore, the second section of the first coupling-out section can transmit the ambient light.

The display device according to the invention can be called an HMD device (Head-Mounted-Display device). The display device can comprise further elements known to a person skilled in the art for the operation of the display device.

In the display device according to the invention, the second coupling-out section and/or the coupling-in section can be formed as a Fresnel structure with a projecting property.

In particular, the Fresnel structure can have several Fresnel segments, wherein the optically effective facets of the Fresnel segments optically correspond to an imaginary optical effective surface which is curved and does not have mirror or rotational symmetry. Such an optical effective surface is here called a free-form surface. The free-form surface can in particular also have no translational symmetry.

Such an optical effective surface or free-form surface can initially be computationally optimized independently of its spatial extent, in order that the then-produced optical element with the Fresnel structure has the desired properties. The spatial extent of the free-form surface plays practically no role in the implementation of the free-form surface as a Fresnel structure, as the free-form surface can be provided in an optically equivalent manner by the individual facets, with the result that the above-mentioned computational optimization can be carried out.

The maximum facet height can be predetermined and for example lie in the range of 5-500 μm, in particular in the range of 0.01-0.1 mm.

In particular, the optically active facets are formed at the interface of the multifunctional glass. This simplifies the manufacture. Thus, the Fresnel structure can for example be produced by diamond cutters. However, it is also possible to produce the Fresnel structure or the multifunctional glass by moulding and casting methods.

The Fresnel segments can be formed as reflective or as refractive segments. In the case of reflective formation, the reflectivity can be adjusted and lie in a range of from more than 0 to almost 100%.

In particular, the maximum height of each facet in the case of the Fresnel structure can be equally great.

Furthermore, the facet shape can be an approximation, in particular a linear approximation to the shape of the corresponding surface section of the imaginary effective surface. Thus, an optically corresponding effect can still always be achieved. Of course, the optical effect of the Fresnel structure is in reality not identical to the optical effect of the imaginary optical effective surface. According to the invention, it is essential that the deviation of the actual optical effect of the Fresnel structure from the optimum optical effect of the imaginary optical effective surface is so small that the optical element meets the optical requirements set, as is always the case with optical elements, which in reality never achieve the theoretical maximum optical effect.

The facets can be curved concavely or also convexly in cross section.

Furthermore, the Fresnel segments can be directly neighbouring. However, it is also possible that individual Fresnel segments are spaced apart from each other.

The optically effective surface with the Fresnel structure is in particular a continuous surface.

In embodiments of the invention a display method comprises measuring the intensity of ambient light coupled via the first coupling-out section into the multifunctional glass, guided in the latter to the second coupling-out section and coupled out of the multifunctional glass via the second coupling-out section and by controlling the brightness of the image depending on the intensity measured.

The desired contrast can thus be adjusted depending on the ambient brightness.

In the method, the second coupling-out section and the coupling-in section can be the same section.

Furthermore, it is possible that, in the case of the method, a beam splitter which directs the light coupled out of the second coupling-out section onto the detector is arranged between the second coupling-out section and the image generation module.

In addition, in the case of the method, the image can be guided in the multifunctional glass along an image beam path, wherein the ambient light coupled via the first coupling-out section into the multifunctional glass passes through the image beam path.

In the ease of the method, the image generation by means of the image generation module can be interrupted during the intensity measurement.

Furthermore, it is possible that a phototropic layer is formed on a front side of the multifunctional glass. The phototropic layer can be implemented as a passive or as an active layer.

In the case of the method, the first coupling-out section can be formed on the front side or rear side of the multifunctional glass as an element with a diffractive effect.

Furthermore, in the case of the method, the intensity can be measured space-resolved and the brightness in the generated image can be controlled space-resolved.

Advantageous embodiments of the method according to the invention are given in the dependent method claims.

In particular, it is possible to measure the intensity space-resolved. Thus, e.g. an image of the perceptible surroundings can be measured. The control of the image brightness can in this case also be varied space-resolved, with the result that an optimum adaptation to the brightness in the present surroundings is possible.

The Fresnel segments are preferably formed at an interface of the multifunctional glass. This simplifies the production of the multifunctional glass.

The Fresnel structure can be produced on the basis of production data which are generated computationally by dividing an optical model surface into several height ranges and computationally arranging the surface sections of the individual height ranges or approximations of these surface sections at a base surface (e.g. on or under the base surface) such that they optically correspond to the optical effective surface. The division into the several height ranges can take place at a constant height or also at varying heights. In particular, the height lies in the range of 5-500 μm. Particularly preferably, the range is 0.01-0.1 mm.

The height ranges can in particular be chosen such that the distance from the base surface is constant in each case.

The surface sections or the approximation of the surface sections can be arranged computationally at a flat or at a curved base surface.

In particular, a linear approximation can be chosen as an approximation of the surface sections. However, any other type of approximation is also possible.

The facets can be formed such that the maximum height of all the facets is equally great.

The multifunctional glass of the display device of the present invention can be formed in the same way as the multifunctional glass of WO 2008/089992 A1. Furthermore, the image generation module of the present application can be formed in the same way as the image generation modules described in WO 2008/089992 A1. The contents of WO 2008/089992 A1 are hereby incorporated in full into the present application.

It is understood that the features named above and still to be explained below can be used not only in the given combinations, but also in other combinations or alone, without departing from the framework of the present invention.

DESCRIPTION OF THE FIGURES

The invention is explained in further detail below by way of example using the attached drawings which also disclose features essential to the invention. There are shown in.

DESCRIPTION OF THE FIGURES

Figure 1:
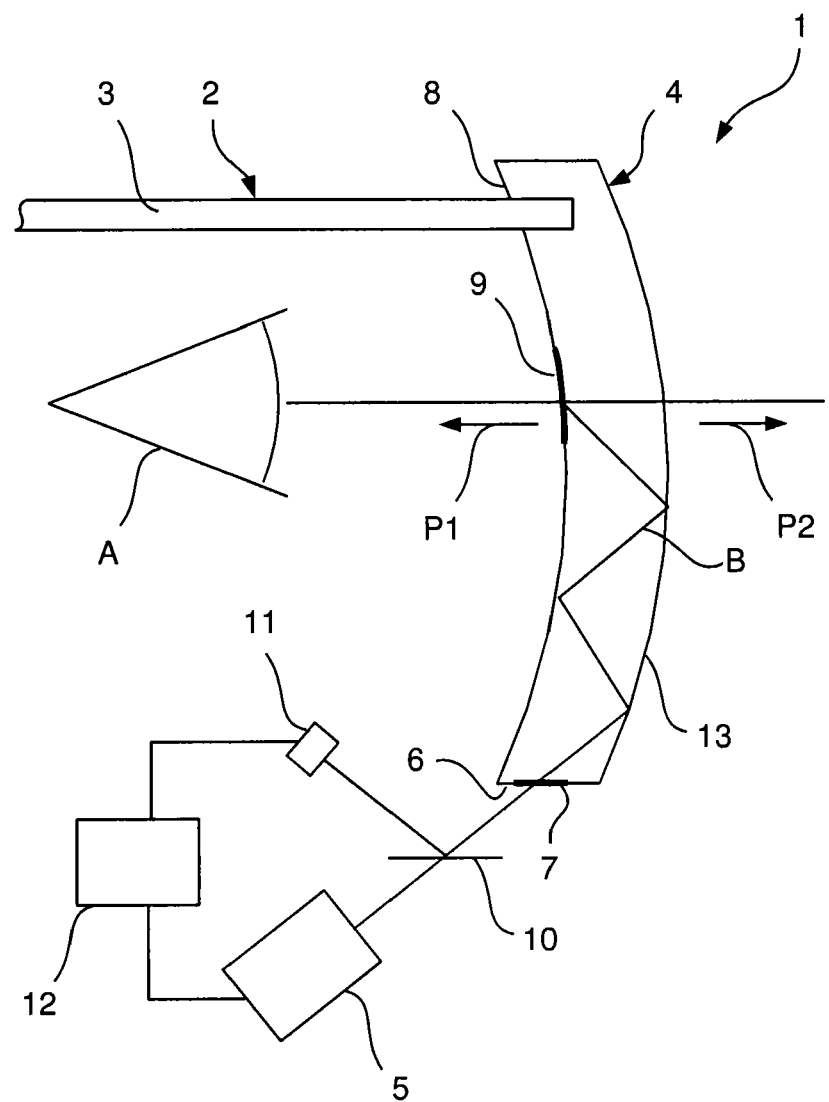
FIG. 1 is a schematic view of a first embodiment of the display device according to the invention.

In the embodiment shown in FIG. 1, the display device 1 according to an embodiment of the invention comprises a holding device 2, able to be fitted on the head of a user, in the form of a glasses frame, wherein only one side arm 3 is drawn in schematically in FIG. 1.

Two multifunctional glasses 4 for both eyes A of the user are attached to the holding device 2. In the side view of FIG. 1, only one multifunctional glass 4 and one eye are represented schematically.

The display device furthermore comprises an image generation module 5 with which an image is generated which is to be presented to the user of the display device in superimposition with the surroundings perceptible for the user through the multifunctional glass 4 when the user is wearing the display device on his head. For this, the multifunctional glass has a coupling-in section 7 on its underside 6 and a coupling-out section 9 on its rear side 8. The coupling-out section 9 is formed as a diffractive element and serves to deflect light coupled in via the coupling-in section 7 from the image generation module 5 in the direction of the eye A of the user, with the result that the user can perceive the generated image as a virtual image in superimposition with the surroundings. The coupling-in section 7 can, but need not, be formed as a diffractive element. In the multifunctional glass 4, the light is guided to the coupling-out section 9 along an image beam path B on the basis of three total internal reflections The coupling-out section is formed such that the −1st diffraction order runs in the direction of the arrow P1 and the +1st diffraction order in the direction of the arrow P2, wherein the coupling-out section 9 is preferably optimized inasmuch as more light is diffracted into the −1st diffraction order than into the +1st diffraction order. Because the coupling-out section 9 is transmissive in the direction of the 0th diffraction order (thus for radiation in the direction according to arrow P1 or arrow P2), the user can perceive the surroundings in superimposition with the image generated by the image generation module 5.

However, a certain proportion of the light coming from the surroundings is coupled into the image beam path B at the coupling-out section 9 on the basis of the +1st diffraction order, is guided to the coupling-in section 7 in the opposite direction to the light of the image generation module in the multifunctional glass 4 and leaves the multifunctional glass 4 via the coupling-in section 7. A beam splitter 10 which directs a part of the light coming from the coupling-out section 9, and thus from the surroundings, onto a detector 11 is arranged between the coupling-in section 7 and the image generation module 5.

The detector 11 measures the intensity of the light striking it and sends a corresponding measurement signal to a control unit 12 of the display device 1. The control unit 12 is connected to the image generation module 5 and controls the image generation module 5 depending on the measurement signal of the detector 11 such that the user can perceive the image generated by the image generation module 5 with a degree of brightness relative to the brightness of the surroundings in the superimposed state. Thus, for example the brightness of the image generated by means of the image generation module 5 can be increased as the ambient brightness increases. Of course, it is also possible for example to take into account the intensity measured by means of the detector 11 by having a predetermined contrast ratio between the image generated by the image generation module 5 and the surroundings.

During the control or regulation of the display device 1, the illuminating engineering input variables can be taken into account as follows.

The ambient radiance $L'_e(\lambda)_{ambient}$ of the surroundings perceptible through the multifunctional glass 4 on the rear side (thus between multifunctional glass 4 and eye A) is, for a glass transmittance $\tau(\lambda)_1$ through the multifunctional glass 4 (from right to left in the direction of the arrow P1 in FIG. 1), $$L'_e(\lambda)_{ambient} = L_e(\lambda)_{ambient}(\lambda) * \tau(\lambda)_1 \tag{1}$$

wherein $L_e(\lambda)_{ambient}$ is the ambient radiance striking the multifunctional glass 4. The ambient luminance $L'_{ambient}$ which the eye A sees behind the multifunctional glass is $$L'_{ambient} = \int_\lambda L'_e(\lambda)_{ambient}(\lambda) * v(\lambda) d\lambda \tag{2}$$

The radiance which the light sensor or detector 11 sees is calculated as follows:

$$L''_e(\lambda)_{ambient} = L_e(\lambda)_{ambient}(\lambda) * \prod_{number} \eta_1 * \tau(\lambda)_2 * \tau(\lambda)_3 \tag{3}$$

wherein $\eta_1$ is the diffraction efficiency $$\left( \eta_1 = \frac{Intensity_{of\_diffracted\_beam}}{Intensity_{of\_incident\_beam}} \right)$$

of the coupling-out section 9, $\tau(\lambda)_2$ is the glass transmittance along the image beam path B and $\tau(\lambda)_3$ is the transmittance from the coupling-in section 7 to the detector 10.

The radiance of the image generated by the image generation module 5 after the coupling-out through the coupling-out section 9 at the exit to the eye is $$L'_e(\lambda)_{image} = L_e(\lambda)_{image} * \prod_{number} \eta_2 \tau(\lambda)_4, \tag{4}$$

wherein $\eta_2$ is the diffraction efficiency $$\left( \eta_2 = \frac{Intensity_{of\_diffracted\_beam}}{Intensity_{of\_incident\_beam}} \right),$$

$\tau(\lambda)_4$ is the glass transmission along the optical path inside the glass from the image generation module 5 to the coupling-out section and $L_e(\lambda)_{image}$ is the radiance of the image at the exit from the image generation module 5 (thus in front of the beam splitter 10). The luminance $L'_{image}$ of the image at the exit to the eye A is then $$L'_{image} = \int_\lambda L'_e(\lambda)_{image}(\lambda) * v(\lambda) d\lambda \tag{5}$$

During the light regulation, the correlation between the parameters $L''_e(\lambda)_{ambient}$ of the detector 11, the perceived ambient luminance $L'_{ambient}$ as well as the perceived luminance of the image $L'_{image}$ is therefore taken into account. $L_e(\lambda)_{image}$ can be represented e.g. as $\alpha(L_e(\lambda)_{ambient})^b$+offset. The regulation algorithm can for example start from the following function:

$$L_e(\lambda)_{image} = (42+\text{offset}) * L_e(\lambda)_{ambient}^{0512} \tag{6}$$

The measurement of the ambient brightness can be carried out continuously or also at predetermined intervals. It is advantageous if, during the measurement with the detector 11, the image generation module 5 is switched off briefly, in order to avoid undesired scattered light from the image generation module 5 which could distort the measurement. This temporary switching off of the image generation module 5 can be of such a short duration that a user cannot perceive it while using the display device 1.

The coupling-out section 9 can be formed coupled out not only as a diffractive coupling-out section but also as a refractive coupling-out section. In this case, it is preferably formed as a Fresnel structure.

Figure 2:
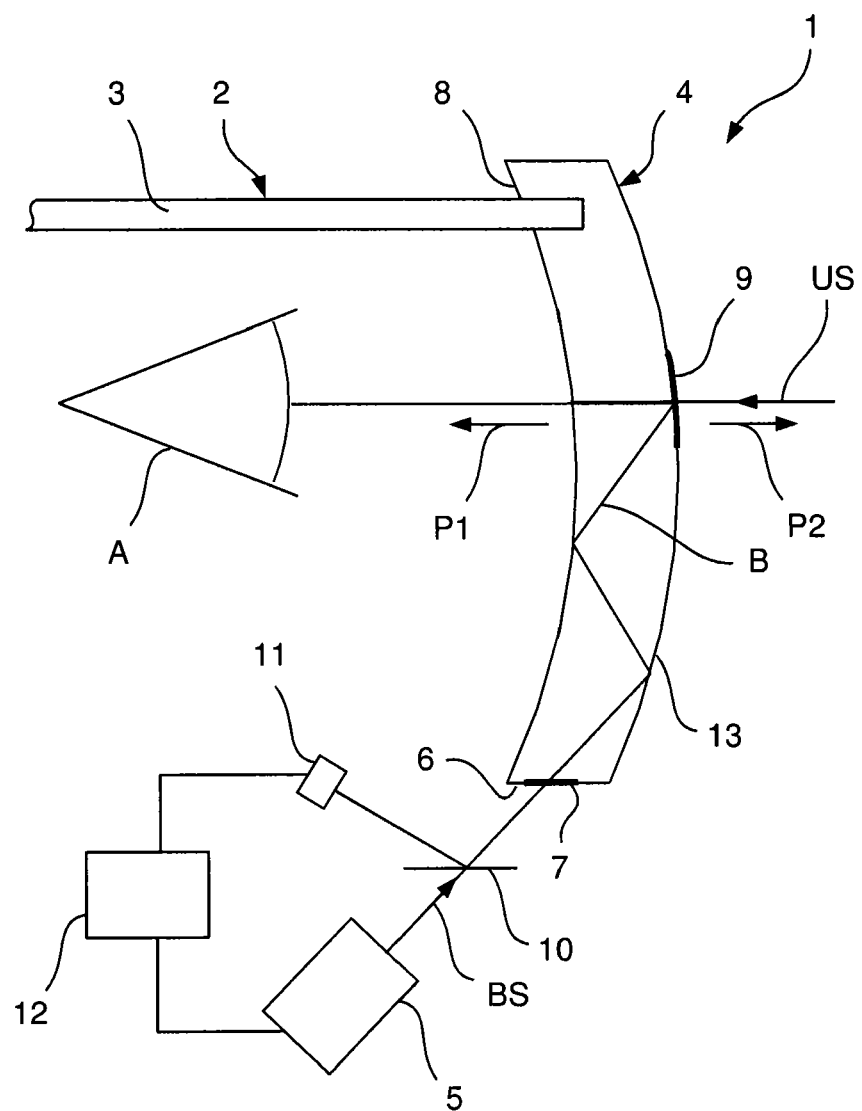
FIG. 2 is a schematic view of a second embodiment of the display device according to the invention.

According to an alternative embodiment, which is represented in FIG. 2, the coupling-out section 9 can also be formed on the front side 13 of the multifunctional glass 4. In this case, the light from the image generation module 5 does not immediately leave the multifunctional glass 4 after reflection at the coupling-out section 9, but passes through it in the direction of the arrow P1 and then leaves on the rear side 8.

The coupling-out section 9 can also be called a superimposition area 9, as it effects a superimposition of the light coming from the surroundings, represented in FIG. 2 by the arrow US, with the light BS of the image generation module 5 coupled in via the coupling-in section 7. As can be seen in particular from the top view in FIG. 3, the superimposition area is formed substantially circular and is divided into a first section 20 and a second section 21, wherein the first section 20 serves to deflect the image ray beam BS coming from the image generation module 5 and the second section 21 serves to transmit the ambient ray beam US coming from the surroundings. The superimposition area 9 has a plurality of sub-sections S spaced apart from each other which are distributed at random in the superimposition area 9 in the case of the embodiment described here.

Figure 3:
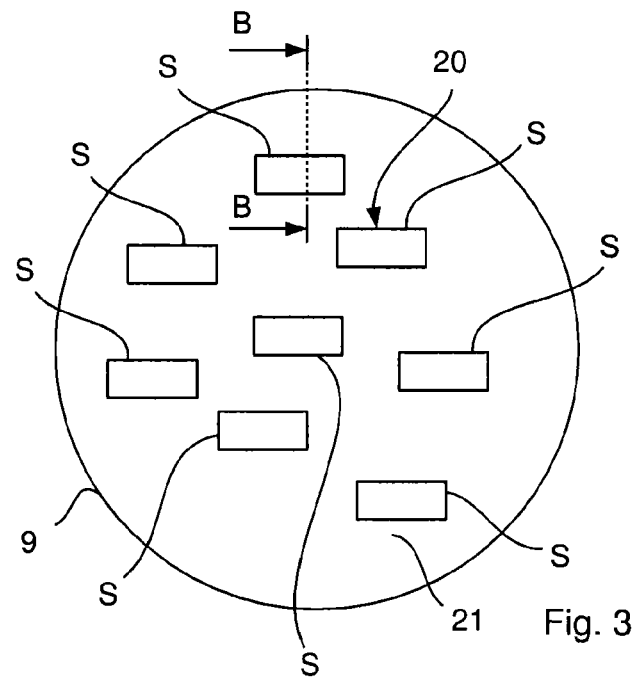
FIG. 3 is a top view of the coupling-out section 9 of the multifunctional glass 4 from FIG. 2.
Figure 4:
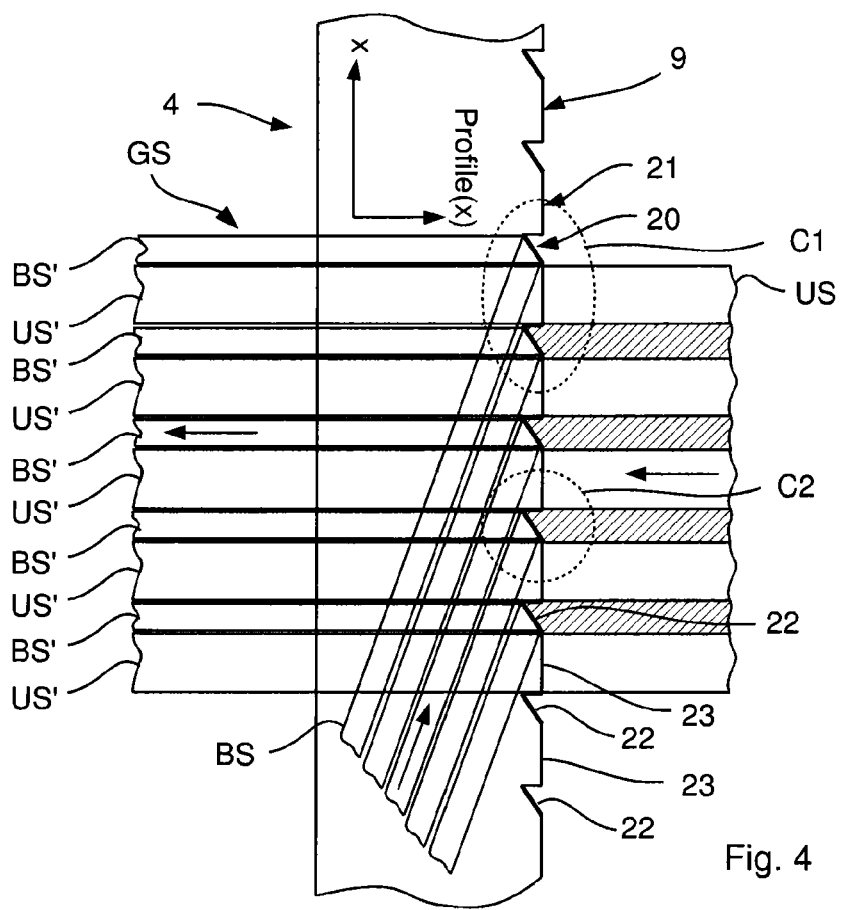
FIG. 4 is an enlarged sectional view along the section line B-B in FIG. 3.

As can be seen from the enlarged sectional representation (FIG. 4) along the line B-B of one of the sub-sections S in FIG. 3, each sub-section S has a plurality of deflecting mirrors 22 spaced apart from each other which here extend perpendicular to the plane of drawing of FIG. 4.

The areas between the deflecting mirrors 22 in the sub-sections S as well as the remaining areas of the superimposition area 9 alongside the sub-sections S together form the second section 21. The first section 20 is formed of the deflecting mirrors 22.

As can furthermore be seen from FIG. 4, the superimposition area 9 and thus also the deflecting mirrors 22 are formed on the front side 13 of the multifunctional glass 4. Although the front side 13 is curved, the curvature is not shown in FIG. 4, to simplify the representation. The deflecting mirrors 22 are tilted relative to the normals of the front side 13 such that the part of the image ray beam BS which strikes the respective deflecting mirror 12 is deflected towards the eye A as an image partial beam BS'. The remaining part of the image ray beam BS which does not strike the deflecting mirrors 12 is reflected and/or transmitted at the front side 8 such that it is not perceptible for the user.

The part of the ambient ray beam US which strikes the rear sides of the deflecting mirrors 22 (from the right in FIG. 4) is screened by the deflecting mirrors 22 such that the user cannot perceive this part. This part is therefore drawn in hatched in FIG. 4. The remaining part of the ambient ray beam US passes through the transmissive areas 23 between or alongside the deflecting mirrors 22 as ambient partial beams US'.

The superimposition area 9 thus effects a superimposition of the part US' of the ambient ray beam US passing through the transmissive areas 23 which form the second section 21 with the part BS' of the image ray beam BS reflected at the deflecting mirrors 22 to form a common ray beam GS. The user wearing the display device 1 on his head can thus perceive the image generated by means of the image generation module 5 in superimposition with the surroundings.

In the schematic representation of FIG. 4, the beams BS' and US' run parallel to each other. However, this need not be the case. Thus, a "through-mixing" of the beams BS' and US' takes place e.g. because of the curvature of the front side.

The thus-formed superimposition area 9 has the advantage that it is very broad band compared with diffractive solutions.

Furthermore, the superimposition area also has one or more deflecting elements, not drawn in, which ensure that a small part of the ambient ray beam US is coupled into the image beam path B and thus runs to the coupling-in section 7 in the same way as in the embodiment of FIG. 1 in the multifunctional glass 4 in the opposite direction to the image ray beam BS, emerges from the multifunctional glass 4 via this and strikes the detector 11 by means of the beam splitter 10.

The individual deflecting mirrors 22 are preferably arranged distributed irregularly over the superimposition area 9, as is the case here on the basis of the sub-sections S distributed at random in the superimposition area 9. Of course, the distance between neighbouring deflecting mirrors 22 can e.g. also vary. Any other distribution of the deflecting mirrors 22 in the superimposition area 9 is also possible. The surface portion of the deflecting mirrors 22 relative to the whole surface of the superimposition area 9, seen in top view of the superimposition area 9, can lie e.g. in the range of 5-30%.

Figure 5:
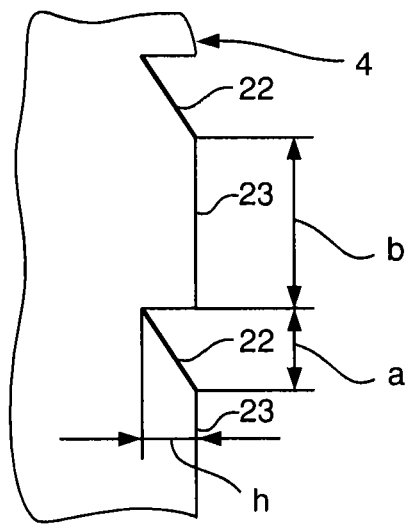
FIG. 5 is an enlarged view of the detail C1 from FIG. 4.

Of course, it is also possible that deflecting mirrors 22 are provided in the whole superimposition area. In this case, the above-named surface portion can be achieved by having the ratio b/a lie in the range of from 3:1 to 20:1 (FIG. 5, which shows the detail C1 from FIG. 4 enlarged). In all the embodiments described, the height h preferably lies in the range of 5-500 μm, in particular in the range of 0.01-0.1 mm. A size of preferably 20-30 μm has proved to be very advantageous for the parameter a.

The first section 20 in FIG. 3 can also be called a discontinuous Fresnel structure, because of the deflecting mirrors 22 arranged distributed on the basis of the distributed sub-sections. This Fresnel structure can be determined as follows. The initial assumption is the general surface function f(x,y) indicated below.

$$f(x, y) = \sum_{i=0}^{N} \sum_{j=0}^{N} (c_{i,j} x^i y^j) \quad (7)$$

The surface function f(x,y) can in particular describe a curved surface. The curved surface can be formed rotationally symmetrical. For example, the surface function can describe a rotational asphere. However, it is also possible that it describes a surface which is curved and does not have mirror and rotational symmetry. Such a surface can also be called a free-form surface. The free-form surface can preferably have no translational symmetry.

By previously specifying a maximum groove depth h (here e.g. between 0.01 and 0.1 mm), the following actual profile function can be deduced as a profile height taking into account the height z(x,y) of the front side 8 of the multifunctional glass 4.

$$\text{profile} = z(x,y) - \text{modulo}(f(x,y),h) \quad (8)$$

Figure 6:
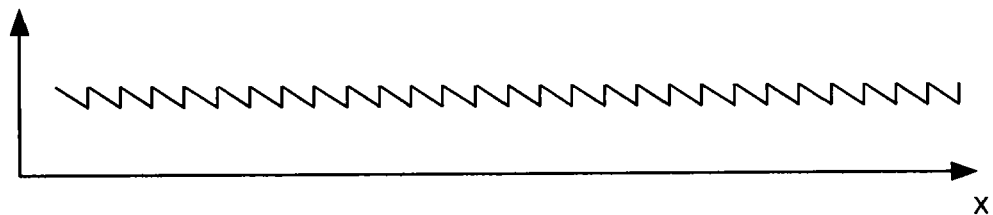
FIG. 6 is a schematic view to illustrate the arrangement of the deflecting elements.

Here, modulo(f(x,y),h) describes the respective Fresnel proportion which increases from 0 to h and then drops back to 0 in one step. Thus, modulo(f(x,y),h) describes a triangular function for a right-angled triangle. The following continuous profile function, such as is shown schematically in FIG. 6, is thus obtained.

Figure 7:
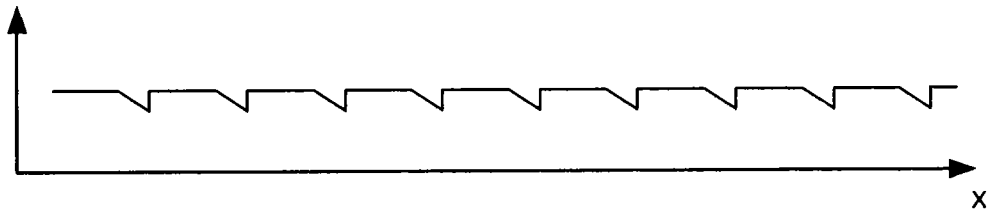
FIG. 7 is a further schematic view to illustrate the arrangement of the deflecting elements.

Depending on the desired surface ratio of deflecting mirrors 22 to the whole superimposition area and the size and number of the sub-sections S, areas or sections of this profile function are substituted by the spherical radius of the front side 8 of the multifunctional glass 4, with the result that the Fresnel structure shown below in FIG. 7 results. Because of the schematic representation of only a small section of the front side 8, the spherical curvature of the front side cannot be seen in this representation.

In the embodiment example described here, the following polynomial coefficients were used, wherein the first figure with the coefficient c stands in each case for the power x and the second figure for the power y, with the result that e.g. c21 is the coefficient before xxy. Any coefficients c not listed are 0.

| | |
|---|---|
| c10 | 3.09E−02 |
| c01 | −5.69E−01 |
| c11 | −1.00E−04 |
| c21 | 2.71E−05 |
| c12 | 1.34E−05 |
| c22 | 2.57E−06 |
| c20 | 3.17E−03 |
| c02 | 2.44E−03 |
| c30 | 2.64E−05 |
| c03 | 2.23E−05 |

The multifunctional glass radius to which the Fresnel structure is applied here is 105.08 mm.

Figure 8:
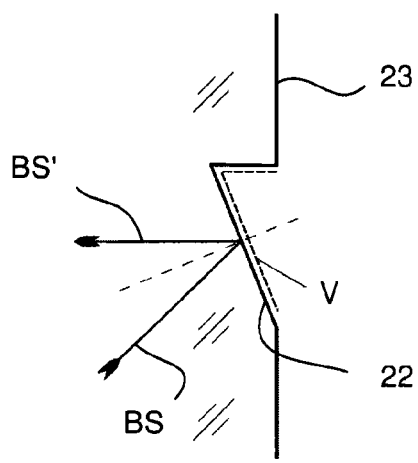
FIG. 8 is an enlarged view of the detail C2 from FIG. 4.

In the embodiment described, the deflecting mirrors 22 are formed by a metallization V of the inclined sections, as can be seen in the enlarged view of the detail C2 from FIG. 4 in FIG. 8.

Figure 9:
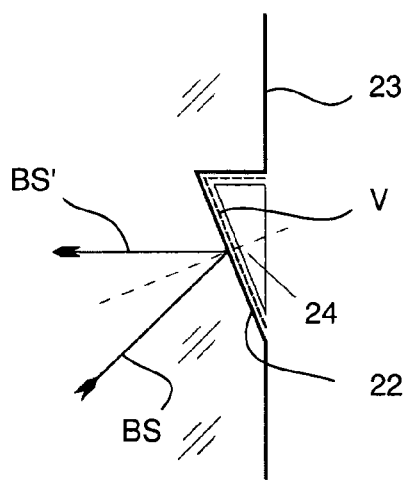
FIG. 9 is an enlarged view of the detail C2 from FIG. 4 according to a first variant.

In FIG. 9, a variant is shown in which the free area which is formed on the basis of the tilting of the deflecting mirror 22 relative to the front side and thus to the transmissive areas 23 of the multifunctional glass 4 is filled up with material 24 to the front side. The filling up is preferably carried out such that a smooth, continuous front side is formed. In particular, the same material as for the multifunctional glass 4 itself can be used as material 24.

Figure 10:
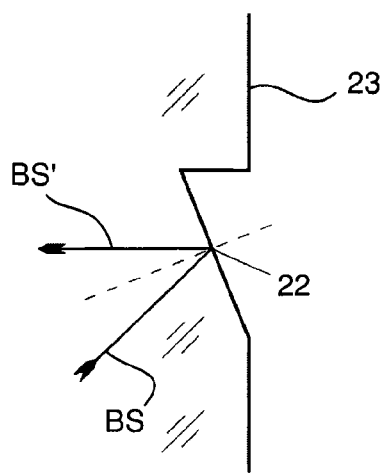
FIG. 10 is an enlarged view of the detail C2 from FIG. 4 according to a further variant.

However, it is also possible to design the superimposition area 9 such that the deflection of the image ray beam BS takes place by total internal reflection, with the result that a metallization is no longer necessary, as is shown in FIG. 10. In this case, the ambient ray beam US is also transmitted by the deflecting elements 22.

Of course, it is also possible to provide the deflecting elements 22 with a partial metallization, with the result that they function both reflectively for the image ray beam BS and transmissively for the ambient ray beam US.

Furthermore, it is possible to form refractive deflecting elements instead of reflective deflecting elements. In this case, the superimposition area 9 is preferably formed on the inside 18 of the multifunctional glass 4, as is shown in FIG. 1.

Figure 11:
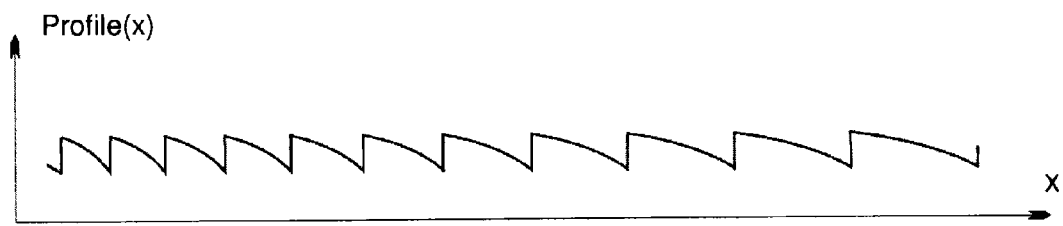
FIGS. 11-13 are examples of further profile shapes for the deflecting elements 12.
Figure 12:
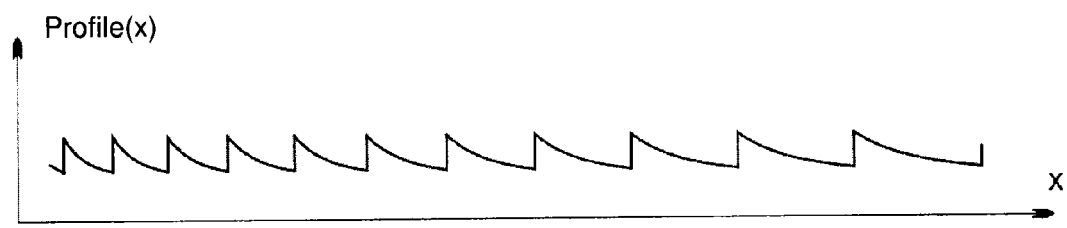

In the embodiments described thus far, the profile shape of the deflecting elements 22 in the sectional representations shown was always linear. However, other profile shapes are also possible. Thus, the edges can be curved convexly in cross section, as is indicated in FIG. 11. The representation in FIG. 11, and also in FIGS. 12 and 13, corresponds to the representation from FIG. 6, with the result that, starting from this profile shape, the spherical radius is still to be provided in areas instead of the profile course shown, in order to then arrive at the desired profile course in the sub-sections S. A concave edge curvature, as is indicated in FIG. 12, can also be provided.

Figure 13:
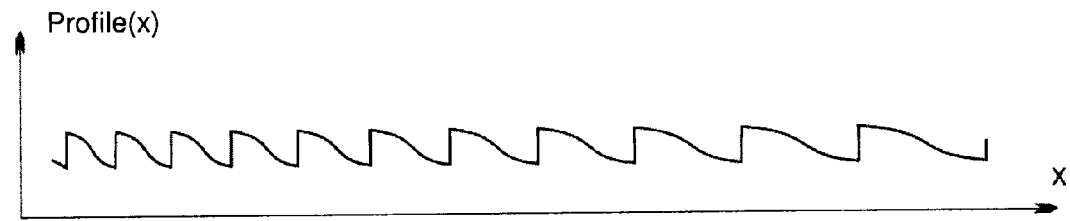

Any desired curvature can also be provided, as is indicated schematically in FIG. 13.

In a variant (not shown) of the multifunctional glass 4, the folding of the beam path of the light from the image generation module 5 can be effected in the multifunctional glass 4 between the coupling-in section 7 and the superimposition area 9 by one or more Fresnel surfaces in the manner of the superimposition area 9.

Figure 14:
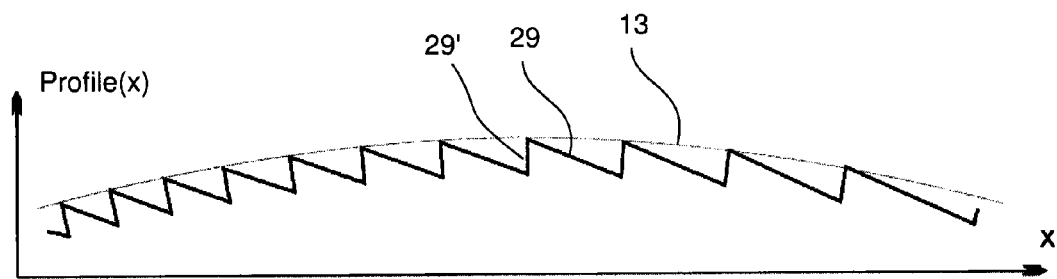
FIG. 14 is a further example of the formation of the deflecting mirrors and the sight-restricting edges.

In FIG. 14, a further profile is shown which differs from the profiles described thus far essentially in that the edges 29' which connect the deflecting mirrors 29 are no longer oriented parallel to each other in cross section, but radially to the centre, not shown, of the front side 13.

Figure 15:
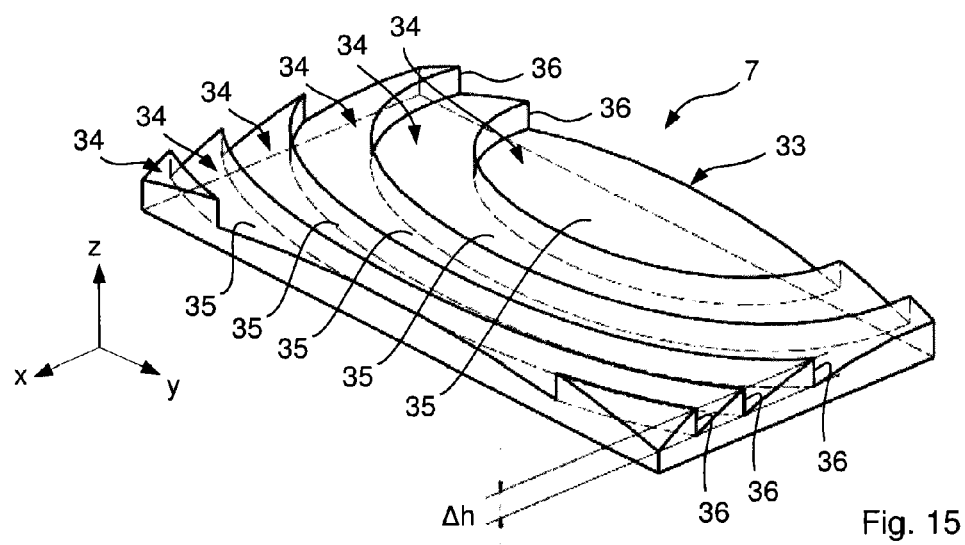
FIG. 15 is a perspective view of the coupling-in section 7.

The coupling-in section 7 can be formed as a Fresnel surface (Fresnel structure 33 with several Fresnel segments 34) which has an optically imaging property. An enlarged partial view of such a coupling-in section 7 is shown in FIG. 15, wherein the coupling-in section 7 is shown rotated by 180° compared with FIGS. 1 and 2 to simplify the representation. The light from the image generation module 5 thus strikes the coupling-in section 7 from above.

Each Fresnel segment 34 has an optically effective facet 35. In order to achieve the step shape shown in FIG. 1, each Fresnel segment 34 normally also comprises an edge 36 which here extends essentially perpendicular to the underside 6.

Figure 16:
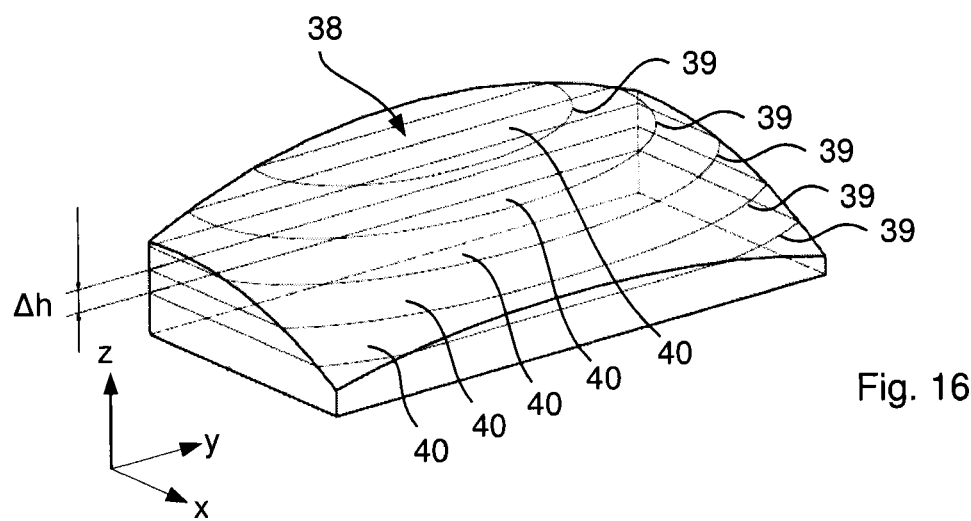
FIG. 16 is the course of the optical effective surface which is simulated with the Fresnel structure 33 according to FIG. 15.

The common optical effect of the facets 35 corresponds to an imaginary optical effective surface 38, such as is shown in FIG. 16, wherein the optical effective surface 38 is curved and preferably does not have mirror or rotational symmetry. As can easily be seen from the comparison of FIGS. 15 and 16, the representation in FIG. 16 is rotated by 90° about the z-axis compared with the representation in FIG. 15. The imaginary optical effective surface 38 can be implemented as a Fresnel structure 33 according to FIG. 15 as follows.

Figure 17:
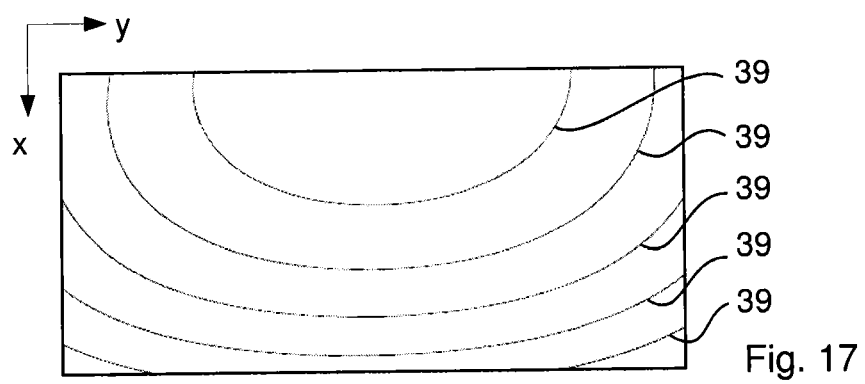
FIG. 17 is a top view of the coupling-in section 7 according to FIG. 15.

The effective surface 38 is divided in z-direction into sections of equal height $\Delta h$. Section lines 39 which can also be called contour lines and which each delimit a surface section 40 of the effective surface 38 thus result. The surface sections 40 are all shifted in z-direction towards each other such that the lower section line (the one with the lower z-value) and thus the lower rim of the facet 35 each lie at the same height (in z-direction). The perpendicular edge 36 is then guided from the respective upper section line of the surface sections 40 and thus from the upper rim of the facet 35 to the lower section line of the directly neighbouring surface section 40, in order to arrive at the stepped formation of the Fresnel structure 33 according to FIG. 15. The upper rims are to be seen in the top view in FIG. 17 of the optical element 1 from FIG. 15.

The steps that are to be performed in order to arrive at the desired Fresnel structure 33 from the imaginary optical effective surface 38 which is curved and preferably has no mirror or rotational symmetry are explained in detail below in conjunction with FIG. 18, in which an xz-section of the effective surface 38 is shown which is different from the effective surface 38 of FIG. 16, but again is curved and has no mirror or rotational symmetry. The division into surface sections 40 (in the sectional representation of FIG. 18 these surface sections are of course line sections) of equal height is represented by the dotted section lines in FIG. 18.

Figure 18:
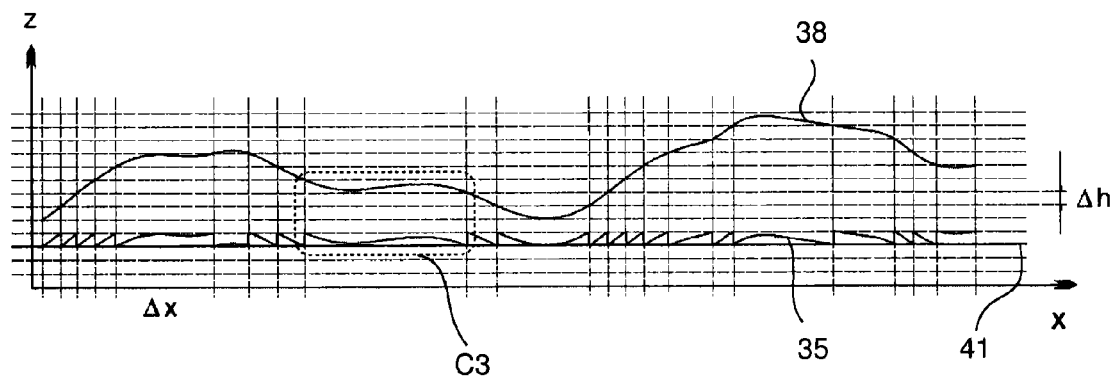
FIG. 18 is an xz section of the active surface 38.
Figure 19:
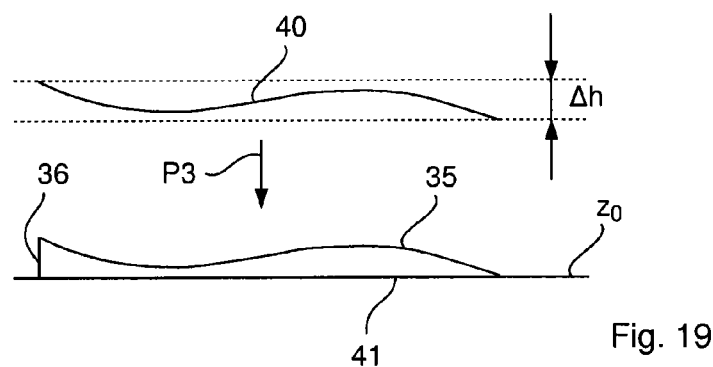
FIG. 19 is an enlarged representation of the detail C3 from FIG. 18.

It can be seen in the enlarged representation of the detail C3 from FIG. 18 in FIG. 19 that the surface section 40 shown is clearly defined on the basis of the predetermined distance $\Delta h$ and is then reduced to the height $z_0$, as is represented schematically by the arrow P3. Furthermore, the edge 36 which extends perpendicular to the height $z_0$ is also added on the left side of the surface element or the facet 35. Thus, the Fresnel structure 33 is formed on a level base surface 41 at height $z_0$.

Thus, the following Formula 1 can be presented for the Fresnel structure 33, wherein $z_F$ describes the Fresnel structure 33, $z_{base\_surface}$ the surface shape of the base surface 41 (here a plane) to which the Fresnel structure is applied and $z_{facet}$ the Fresnel facets 35 relative to the base surface 41:

$$z_F = z_{base\_surface} + z_{facet} \qquad (9)$$

The surface $z_{facet}$ of the facets, which can also be called "Fresnelled" free-form surface, is calculated according to the following Formula 10

$$z_{facet} = \mathrm{modulo}(z_{effective\_surface}, \Delta h) \qquad (10),$$

wherein the effective surface 38 is described by the following surface formula $z_{effective\_surface}$ $$z_{effective\_surface}(x, y) = \qquad (11)$$

$$K1 + K2 + b_{10}x + b_{01}y + b_{11}xy + b_{21}x^2y + b_{12}xy^2 + \sum_{\substack{i=2 \\ j=2}}^{M} b_{ij}x^i y^j,$$

in which K1 denotes the conical term in x-direction and K2 the conical term in y-direction, as is given below $$K1 = \frac{c_x x^2}{1 + \sqrt{1 - (1 + k_x)c^2 x^2}}, \qquad (12)$$

-continued $$K2 = \frac{C_y y^2}{1 + \sqrt{1 - (1 + k_y)c^2 y^2}}. \tag{13}$$

By applying the modulo function to the effective surface 38, the effective surface 38 is divided in z-direction into distances with equal height Δh. Thus, the maximum height of the facets 35 is Δh in each case. The modulo function used is given below $$modulo(a, m) = a - \left\lfloor \frac{a}{m} \right\rfloor \cdot m, \tag{14}$$

wherein the Gaussian brackets $$\left\lfloor \frac{a}{m} \right\rfloor$$

indicate the largest whole number that is smaller than or equal to the number in the Gaussian brackets, thus the result of the division a/m without the remainder of the division. The following formula thus results for the facet surfaces $$z_{facet} = \tag{15}$$
$$modulo(z_{effective\_surface}, h) = z_{active\_surface} - \left\lfloor \frac{z_{effective\_surface}}{\Delta h} \right\rfloor \cdot \Delta h.$$

According to the above-described procedure, the corresponding Fresnel structure 38 which provides the corresponding optical effect can be deduced on the basis of a desired optical effective surface 38 which is curved and preferably does not have mirror or rotational symmetry. Although the same optical effect cannot be achieved on the basis of the stepped shape with the Fresnel structure 33 which would have an optical element the interface of which is formed according to the effective surface 38, a comparable optical effect is achieved.

Figure 20:
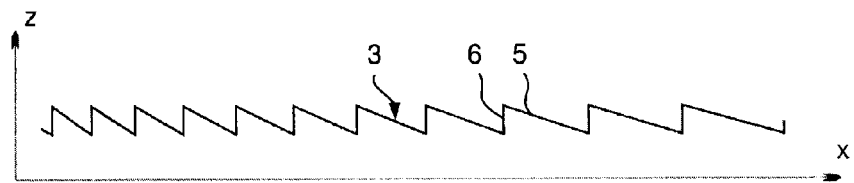
FIG. 20 is a profile shape of the Fresnel structure 33.

As can be seen from the representation in FIGS. 18 and 19, the facets 35 have the curvatures predetermined by the effective surface 38 in the height range Δh. In order to simplify the production of the Fresnel structure 33, it is possible to approximate the course of the individual facets 35 to the corresponding surface shape of the effective surfaces 38. In the simplest case, the course can be linearized as is represented schematically in the sectional view of FIG. 20. However, it is also possible to provide the facets with a convex curvature (FIG. 11) or a concave curvature (FIG. 12). An approximation by another curvature course is also possible, such as is indicated for example in FIG. 13.

With this procedure according to the invention for enabling any curved effective surface 38 to be formed on a flat surface as a Fresnel structure, a design optimized in terms of installation space is possible for example.

In the previously described embodiment examples of the Fresnel surface for the coupling-in section 7, in each case a flat surface or a plane was assumed as base surface. Of course, it is also possible to provide a base surface differing from this if e.g. the Fresnel structure 33 is to be formed on a spherically curved surface. In this case, a fine-tuning can virtually be carried out by means of the Fresnel structure 33 e.g. by correcting further aberrations of the spherical surface or other imaging errors of the multifunctional glass 4.

Figure 21:
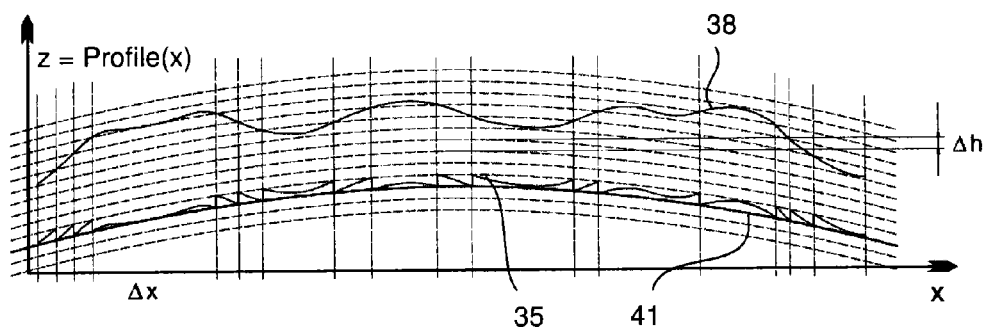
FIG. 21 is a sectional view of a further effective surface 38 which is realized as a Fresnel structure 33 on a curved base surface 41.

As shown in FIG. 21, the effective surface 38 is divided at intervals of equal height Δh, wherein the height here is in each case observed relative to the local surface normals of the base surface 41. The distance between the section lines drawn in is thus constant in each case relative to the base surface 41.

Figure 22:
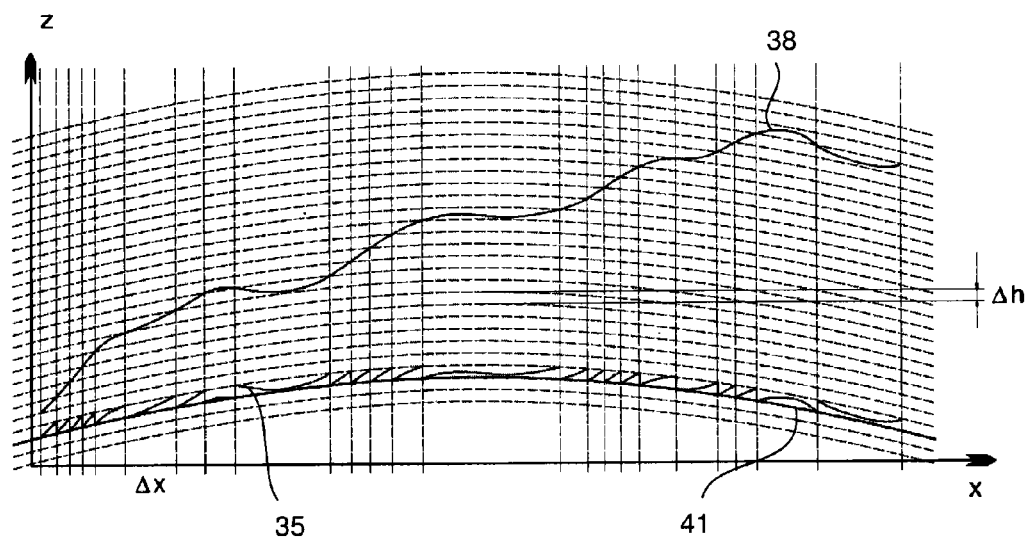
FIG. 22 is a further effective surface 38 which is again transposed onto a curved base surface 41 with an optically equivalent effect to a Fresnel structure.

An example is shown in FIG. 22 in which the effective surface 38 is strongly tilted relative to the spherical base surface 41. Also in this ease, it is not a problem to form the effective surface 38 as a Fresnel structure 33 on the base surface 41 without having to change the macroscopic shape of the base surface 41. The height Δh can here, as in all the other embodiments, lie in the range of 5-500 μm, in particular in the range of 0.01-0.1 mm. Furthermore, the height Δh need not be constant, but can vary here, as in all the other embodiments. Thus, e.g. Δh can itself increase or decrease as the z-value increases.

Figure 23:
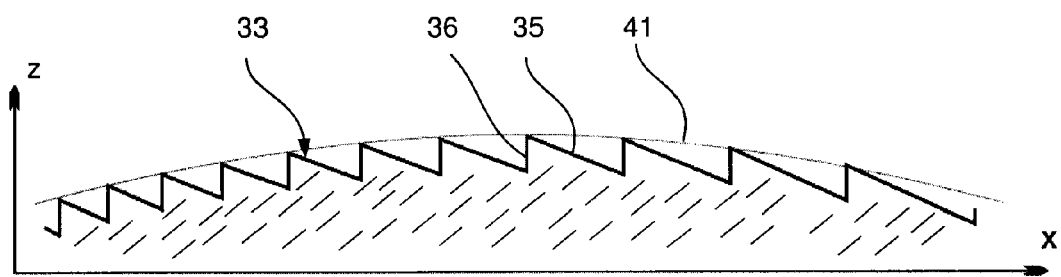
FIGS. 23-24 are sectional views of a Fresnel structure at a curved base surface 41.

In FIG. 23, a sectional view of a Fresnel structure 33 at a curved base surface 41 is shown in which the facets 35 are each formed linearly. The individual edges 36 are aligned parallel to each other, wherein the original course of the base surface 41 is also drawn in schematically. In this embodiment, the facet function $z_{facet}$ has been deducted from the base surface function $Z_{base\_surface}$ in a variant of Formula 9 with the result that the Fresnel structure 33 can be described as follows:

$$z_F = z_{base\_surface} - z_{facet} \tag{16}.$$

This way of calculating $z_F$ is of course also possible in all the already described embodiments as well as in all the embodiments still to follow.

Figure 24:
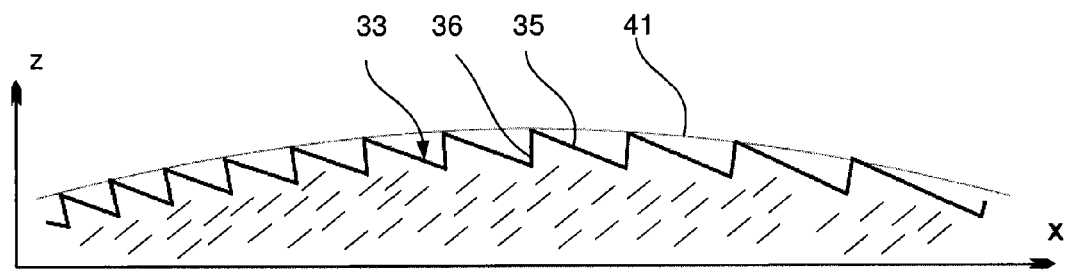

In FIG. 24, a variant of the profile from FIG. 23 is shown which differs essentially in that the edges 36 are no longer oriented parallel to each other in cross section, but radially relative to the centre, not shown, of the base surface 41.

The Fresnel structure 33 described can be provided to fold the beam path of the light from the image generation module 5 in the multifunctional glass 4 between the coupling-in and coupling-out sections 7, 9 on the front and/or rear side 13, 8 of the multifunctional glass 4, wherein the facets 35 are preferably metallized in this case. The facets 35 can be formed in the same way as was described in connection with FIGS. 8-10.

Figure 25:
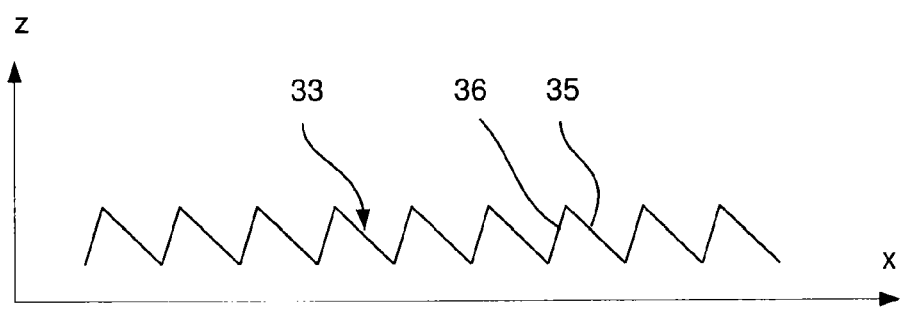
FIG. 25 is a sectional view of a further Fresnel structure 33.

A sectional view of a further Fresnel structure 33 is shown in FIG. 25. In this Fresnel structure 33, the edges 36 do not extend perpendicularly, as in most of the previously described embodiments (thus here in z-direction), but are likewise somewhat tilted. This simplifies the manufacture of the Fresnel structure 33. However, it is preferred if the tilting angle of the edges 36 is as small as possible, with the result that they run quasi perpendicularly. This formation of the facets can also be provided in the structure according to FIGS. 2-14.

Figure 26:
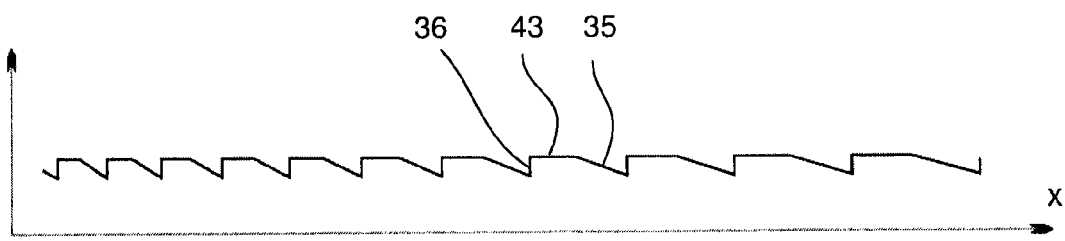
FIG. 26 is a sectional view of a discontinuous Fresnel structure.

The Fresnel structures 33 previously described in connection with FIGS. 15-25 were continuous Fresnel structures. By this is meant that the individual Fresnel facets 35 are always connected to each other by the edges 36. However, it is also possible to provide the Fresnel facets 35 spaced apart from each other and insert sections 43, which can for example be sections of the base surface 41, between the individual Fresnel facets 35. This can easily be realized by replacing areas or sections of the determined Fresnel surface $z_F$ with the course of the base surface $z_{base\_surface}$ in these sections. A profile of such a Fresnel structure 33 is indicated schematically in FIG. 26. The formation substantially corresponds to the embodiments described in connection with FIGS. 2-14.

Figure 27:
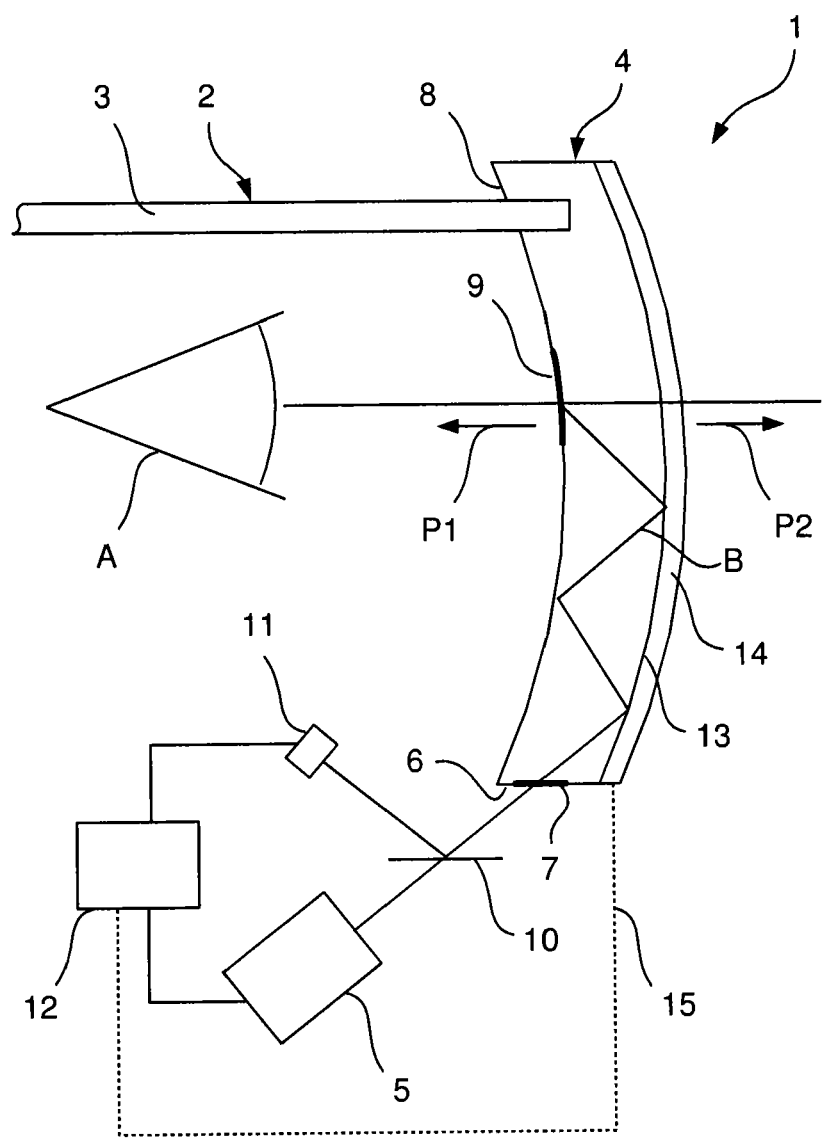
FIG. 27 is a schematic view of a further embodiment of the display device according to the invention.

A further embodiment is shown in FIG. 27, wherein elements identical compared with the embodiments described in connection with FIGS. 1-26 are given the same reference numbers and reference is made to the corresponding description relating to FIGS. 1-26, to explain the function of these elements.

Unlike in the embodiment of FIG. 1, in the embodiment of FIG. 27 a transmission-adjusting or phototropic layer 14 is formed on the front side. This layer 14 can be realized as a passive layer, wherein the transmittance decreases as the ambient brightness increases. Thus, the brightness perceptible to the user becomes smaller. However, once the ambient light has been measured by means of the detector after passing through the phototropic layer 14, the effect of the phototropic layer can be taken into account when controlling the image generation module 5. A very good adaptation of the generated image to the ambient brightness perceptible for the user is thus possible.

The phototropic layer can also be formed as an active layer 14 (for example a liquid crystal coating). The transmission or the transmittance of the active phototropic layer 14 is adjusted by the control unit 12 via the line 15 shown by a dotted line. An optimum adaptation of the image generated by means of the image generation module 5 and the surroundings perceptible for the user can thus be carried out.

The regulation of the display device can be based e.g. on an optimum contrast, wherein the visible contrast (Weber contrast) of image luminance $L'_{image}$ to ambient luminance $L'_{ambient}$ should lie above the threshold contrast and the visible contrast (Weber contrast) of imaging system black level (image luminance for black pixels) to ambient luminance $L'_{ambient}$ should lie below the threshold contrast.

In order to achieve this, the luminance of the data reflection (of the generated image) should be very high and the luminance of the image generation module 5 when switched off (black level) should be very small. This can be achieved by a maximization of the display contrast, such as e.g. in the embodiment of FIG. 1. However, this maximization is limited by the image generation module 5 used. With the image generation modules 5 currently available, the display contrast is at most 100:1. Furthermore, the ambient luminance can be actively reduced independently of the data reflection, as is the case in the embodiment of FIG. 27. In this embodiment, unlike the embodiment of FIG. 1 in which from a certain ambient luminance the perception of the generated image can no longer be guaranteed even with the maximum achievable luminance of the image generation module, it can also be guaranteed for more highly dynamic luminance background scenes that the generated image is perceived.

On the basis of the phototropic layer 14, only the above Formulae (1) and (3) have to be adapted as follows:

$$L'_e(\lambda)_{ambient} = L_e(\lambda)_{ambient}(\lambda) * \tau(\lambda)_{spectacle\_glass} * \tau_5(\lambda, L_e) \quad (1')$$

wherein $\tau_5$ is the transmittance of the phototropic layer 14. Formula 3 changes as follows:

$$L''_e(\lambda)_{ambient} = L_e(\lambda)_{ambient}(\lambda) * \prod_{number} \eta_1 * \tau(\lambda)_2 * \tau(\lambda)_3 * \tau_5(\lambda, L_e) \quad (3')$$

The adjustment of the display device according to FIG. 27 can be carried out in the same way as was described above for the embodiment of FIG. 1. As $\tau_5$ of the phototropic layer 14 can vary in the range of 0.1-0.9, the maximum achievable contrast in the embodiment of FIG. 27 is clearly higher than in the embodiment of FIG. 1.

The invention claimed is:

1. Display device comprising
a holding device that can be fitted onto the head of a user,
a multifunctional glass that is attached to the holding device and through which the user can perceive the actual surroundings when the holding device is fitted on and which has a first and second coupling-out section as well as a coupling-in section,
an image generation module which generates an image and couples it into the multifunctional glass via the coupling-in section such that it is guided in the multifunctional glass to the first coupling-out section which effects a deflection of the image in the direction of the user when the holding device is fitted on his head such that the user can perceive the image in superimposition with the actual surroundings,
a control unit for the image generation module, and
a detector that is connected to the control unit and that measures an intensity of a portion of ambient light that is coupled via the first coupling-out section into the multifunctional glass, the portion of ambient light being guided along a light path in the multifunctional glass to the second coupling-out section and then coupled out of the multifunctional glass via the second coupling-out section to the detector,
wherein the control unit controls the brightness during the generation of the image by means of the image generation module depending on the intensity measured by the detector.

2. Display device according to claim 1, wherein the second coupling-out section and the coupling-in section are the same section.

3. Display device according to claim 1, wherein a beam splitter which directs the light coupled out of the second coupling-out section onto the detector is arranged between the second coupling-out section and the image generation module.

4. Display device according to claim 1, wherein the image is guided in the multifunctional glass along an image beam path, wherein the ambient light coupled into the multifunctional glass via the first coupling-out section passes through the image beam path.

5. Display device according to claim 1, wherein the control unit interrupts the image generation of the image generation module during the intensity measurement by means of the detector.

6. Display device according to claim 1, wherein a phototropic layer is formed on a front side of the multifunctional glass, wherein the phototropic layer is formed as a passive layer or as an active layer which is controlled by means of the control unit.

7. Display device according to claim 1, wherein the first coupling-out section is formed on the front side or rear side of the multifunctional glass as an element with a diffractive action.

8. Display device according to claim 1, wherein the detector measures the intensity space-resolved and the control unit controls the brightness space-resolved in the generated image.

9. Display device according to claim 1, wherein the first coupling-out section has a first section and a second section, and
wherein only the first section, which is formed of at least one of a plurality of reflective and of a plurality of refractive deflecting elements spaced apart from each other, effects the deflection of the image by at least one of reflection and refraction.

10. Display device according to claim 9, wherein the first section has an imaging function for the image.

11. Display device according to claim 1, wherein the first coupling-out section has a third section with at least one of a plurality of reflective and of a plurality of refractive second deflecting elements spaced apart from each other and a fourth section,
wherein the part of the incident ambient light transmitted by the coupling-out section serves to make the surroundings perceptible for the user and the part of the incident ambient light deflected by at least one of reflection and refraction at the second deflecting elements serves to measure intensity.

12. Display device according to claim 1, wherein at least one of the second coupling-out section and the coupling-in section is formed as a Fresnel structure with an imaging property, wherein the Fresnel structure has several Fresnel segments, wherein
the optically effective facets of the Fresnel segments optically correspond to an imaginary optical effective surface which is curved and does not have mirror or rotational symmetry and in particular does not have translational symmetry.

13. Display method for a display device
fitting a holding device onto the head of a user, the holding device supporting a
a multifunctional glass that is attached to the holding device and through which the user can perceive the actual surroundings when the holding device is fitted on and which has a first and second coupling-out section as well as a coupling-in section,
generating an image with an image generation module and coupling the image into the multifunctional glass via the coupling-in section such that the image is guided in the multifunctional glass to the first coupling-out section which effects a deflection of the image in the direction of the user when the holding device is fitted on the head of the user such that the user can perceive the image in superimposition with the actual surroundings, and
determining an intensity of a portion of ambient light that is coupled via the first coupling-out section into the multifunctional glass is determined by guiding the portion of ambient light along a light path, in the multifunctional glass to the second coupling-out section and then coupled out of the multifunctional glass via the second coupling-out section to be measured by a detector and controlling the brightness of the image depending on the intensity measured.

14. Method according to claim 13, further comprising making the second coupling-out section and the coupling-in section are the same section.

15. Method according to claim 13, further comprising arranging a beam splitter which directs the light coupled out of the second coupling-out section onto the detector between the second coupling-out section and the image generation module or wherein the image is guided in the multifunctional glass along an image beam path and the ambient light coupled into the multifunctional glass via the first coupling-out section passes through the image beam path.

16. Method according to claim 14, further comprising arranging a beam splitter which directs the light coupled out of the second coupling-out section onto the detector between the second coupling-out section and the image generation module or wherein the image is guided in the multifunctional glass along an image beam path and the ambient light coupled into the multifunctional glass via the first coupling-out section passes through the image beam path.

17. Method according to claim 13, further comprising interrupting the image generation by the image generation module during the intensity measurement or wherein a phototropic layer is formed on a front side of the multifunctional glass and the phototropic layer is formed as a passive layer or as an active layer.

18. Method according to claim 13, further comprising forming the first coupling-out section on the front side or rear side of the multifunctional glass as an element with a diffractive action or the intensity is measured space-resolved and the brightness in the generated image is controlled space-resolved.

19. Method according to claim 13, further comprising arranging the first coupling-out section to have a first section and a second section,
wherein only the first section, which is formed of at least one of a plurality of reflective and of a plurality of refractive deflecting elements spaced apart from each other, effects the deflection of the image by at least one of reflection and refraction, wherein it is preferred that the first section has an imaging function for the image.

20. Method according to claim 13, further comprising arranging the first coupling-out section to have a third section with at least one of a plurality of reflective and a plurality of refractive second deflecting elements spaced apart from each other and a fourth section,
wherein the part of the incident ambient light transmitted by the coupling-out section serves to make the surroundings perceptible for the user and the part of the incident ambient light deflected by at least one of reflection and refraction at the second deflecting elements serves to measure intensity.

21. Method according to claim 13, further comprising forming at least one of the second coupling-out section and the coupling-in section as a Fresnel structure with an imaging property, wherein
the optically effective facets of the Fresnel segments optically correspond to an imaginary optical effective surface which is curved and does not have mirror or rotational symmetry and in particular does not have translational symmetry.

22. Method according to claim 13, further comprising forming the Fresnel structure to have several Fresnel segments.

* * * * *

UNITED STATES PATENT AND TRADEMARK OFFICE
CERTIFICATE OF CORRECTION

PATENT NO. : 9,030,383 B2  
APPLICATION NO. : 13/121168  
DATED : May 12, 2015  
INVENTOR(S) : Karsten Lindig et al.

Page 1 of 1

It is certified that error appears in the above-identified patent and that said Letters Patent is hereby corrected as shown below:

In the Specification

Col. 4, line 50, delete "ease" and insert --case--

Col. 5, line 45, delete "There are shown in:"

Col. 7, line 65 (equation (4)), delete existing equation and insert the following equation
$$L'_e(\lambda)_{image} = L_e(\lambda)_{image} * \prod_{number} \eta_2 * \tau(\lambda)_4$$

Col. 8, line 15 (equation (5)), delete the existing equation and insert the following equation
$$L'_{image} = \int_\lambda L'_e(\lambda)_{image}(\lambda) * v(\lambda) * d\lambda$$

Col. 8, line 23, delete the second equation and insert -- $a(L_e(\lambda)_{ambient})^b$ --

Col. 8, line 25, delete the equation and insert -- $L_e(\lambda)_{image} = (42 + offset) * L_e(\lambda)_{ambient}^{0.512}$ --

Col. 13, line 30 (equation (15)), delete "." after the equation

Col. 14, line 10, delete "ease" and insert --case--

In the Claims

Col. 17, line 24, after "device" insert --, comprising:--

Col. 17, line 26, delete "a"

Col. 17, line 51, delete "are"

Signed and Sealed this  
Twelfth Day of April, 2016

Michelle K. Lee  
*Director of the United States Patent and Trademark Office*